United States Patent Office 3,239,555
Patented Mar. 8, 1966

3,239,555
BIS-CITRIC ACID ESTERS
Johannes Miksch, Mannheim-Pfingstberg, Lieselotte Bauer, Frankeneck, Pfalz, Adolf Albert, Mannheim, and Otto Zeiss, Schwetzingen, Germany, assignors to Joh. A. Benckiser G.m.b.H., Chemische Fabrik, Ludwigshafen (Rhine), Germany, a corporation of Germany
No Drawing. Filed Dec. 5, 1961, Ser. No. 157,615
Claims priority, application Germany, Dec. 9, 1960, B 60,417, B 60,418
10 Claims. (Cl. 260—475)

The present invention relates to new and valuable citric acid esters and more particularly to citric acid esters wherein the tertiary hydroxyl groups of 2 molecules of citric acid are esterified by a dicarboxylic acid, and the use of such esters as plasticizers.

It is known that citric acid esters can be used as plasticizers. However, heretofore only such citric acid esters were employed for this purpose which either had been acetylated at the tertiary hydroxyl group of the citric acid or which were esterified at the carboxyl groups of citric acid while the hydroxyl group was still free. Carboxyl groups of such citric acid esters were esterified with ethyl alcohol, butyl alcohol, or isooctyl alcohol.

These known citric acid esters have many disadvantages, especially when used as plasticizers in lacquers and plastics. For instance, they exude and separate from the plastic material so that they cannot be used as packing material for food and other sensitive products.

It is one object of the present invention to provide new and valuable bis-citric acid esters which are free of the disadvantages of the heretofore prepared and used esters.

Another object of the present invention is to provide a simple and effective process of producing such citric acid esters.

A further object of the present invention is to provide plastic packing materials containing such citric acid esters as plasticizers which do not exude and separate from the packing material.

Still another object of the present invention is to provide plastic compositions containing the new citric acid esters as plasticizers.

Other objects of the present invention and advantageous features thereof will become apparent as the description proceeds.

In principle, the new esters according to the present invention correspond to the following Formula I.

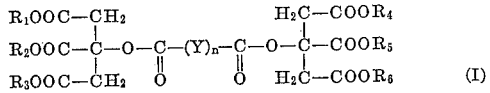

wherein:

$R_1$, $R_2$, $R_3$, $R_4$, $R_5$, and $R_6$ represent alkyl with 1 to 18 carbon atoms, $n$ is one of the integers 0 and 1, and when $n$ is 1, Y is a member selected from the group consisting of alkylene of 1 to 8 carbon atoms, alkenylene of 2 to 3 carbon atoms, and phenylene.

The new bis-citric acid esters have proved to be excellent plasticizers. They are preferably obtained by esterifying citric acid tri-esters esterified in their carboxyl groups with alcohols having 1 to 18 carbon atoms, at their tertiary alcohol group with reactive dicarboxylic acid compounds, preferably their acid halides. Suitable acid halides are the acid halides of saturated aliphatic dicarboxylic acids, such as oxalic acid, malonic acid, succinic acid, glutaric acid, adipic acid, pimelic acid, suberic acid, azelaic acid, sebacic acid, and the like, the acid halides of unsaturated aliphatic dicarboxylic acids, such as fumaric acid, citraconic acid, itaconic acid, and the acid halides of aromatic dicarboxylic acids such as phthalic acid, isophthalic acid, terephthalic acid, and others.

The new citric acid esters wherein not only the carboxyl groups but also the tertiary alcohol group are esterified, are physiologically well tolerated compounds. They can be added as plasticizers, for instance, to various types of plastisols, organosols, nitrocellulose lacquers, and the like plastic compositions alone or in mixture with other citric acid esters of the same type or with other additives and/or plasticizers. They are also used with advantage as adjuvants in the dyeing of textiles. Blocking of lacquers and plastics, for instance, of polyvinyl chloride films, nitrocellulose lacquers, and the like is prevented by the addition of such citric acid esters. The new citric acid esters can be incorporated not only into emulsion polymers and/or suspension polymers, for instance, of polyvinyl chloride, copolymers of polyvinyl chloride and polyvinyl acetate, polyvinylidene chloride, copolymers of polyvinyl chloride and polyvinylidene choride, polyvinyl acetate, copolymers of butadiene and acrylonitrile, and the like.

Furthermore, the new citric acid esters can also be employed for such purposes for which heretofore other citric acid esters were used. The plasticizing property of the new citric acid esters is especially pronounced when $R_1$, $R_2$, $R_3$, $R_4$, $R_5$, and $R_6$ in the esters of Formula I are alkyl radicals with 1 to 18 carbon atoms and preferably with 1 to 8 carbon atoms. $R_1$ to $R_6$ may be the same or different alkyl radicals.

The following examples serve to illustrate the present invention without, however, limiting the same thereto.

Example 1.—Malonic acid 1,3-bis-citric acid triethyl ester 14 g. of malonyl chloride (0.1 mole) and 55 g. of citric acid triethyl ester (0.2 mole) are heated to 80° C. for 5 hours while stirring. The crude ester is poured into water with stirring and is neutralized by the addition of sodium bicarbonate solution. The ester layer is separated from the aqueous layer and is washed with water several times. Thereafter, the ester is dissolved in ether and the ethereal solution is dried over sodium sulfate. After evaporating the ether, the malonic acid 1,3-bis-(citric acid triethyl) ester remains as a colorless oil. Yield: 75% of the theoretical yield. Saponification number: 718 (theoretical value: 723).

Example 2.—Succinic acid 1,4-bis-(citric acid trimethyl) ester 15.5 g. of succinic acid dichloride (0.1 mole) and 46.8 g. of citric acid trimethyl ester (0.2 mole) are heated to 100° C. for 5 hours while stirring. The reaction mixture is then poured into water and is neutralized with the addition of sodium bicarbonate solution. After repeated treatment with water, the initially oily compound is obtained in crystalline form. The succinic acid 1,4-bis-(citric acid trimethyl) ester is obtained in a yield of 70% of the theoretical yield. Saponication number: 813 (theoretical value: 815).

Example 3.—Succinic acid 1,4-bis-(citric acid triethyl) ester 15.5 g. of succinic acid dichloride (0.1 mole) and 55 g. of citric acid triethyl ester (0.2 mole) are heated to 100° C. in a water bath for 9 hours while stirring. The reaction mixture is then poured into water and is neutralized by the addition of sodium bicarbonate solution. After repeated washing with water, the initially oily ester solidifies. The succinic acid 1,4-bis-(citric acid triethyl) ester is obtained in a yield of 83% of the theoretical yield. Saponification number: 707 (theoretical value: 707).

*Example 4.—Succinic acid 1,4-bis-(citric acid tri-n-propyl) ester*

46.5 g. of succinic acid dichloride (0.3 mole) and 191 g. of citric acid tri-n-propyl ester (0.6 mole) are heated in the water/bath to 80–90° C. for 8 hours while stirring. The crude ester is then poured into water, neutralized by the addition of sodium bicarbonate, and separated after washing with water. The ester is further purified by dissolving it in ether, washing the etheral solution with water, and distilling of the ether after drying the solution over sodium sulfate. Succinic acid 1,4-bis-(citric acid tri-n-propyl) ester is obtained in a yield of 70% of the theoretical yield. Saponification number: 625 (theoretical value: 624).

*Example 5.—Succinic acid 1,4-bis-(citric acid tri-n-butyl) ester*

46.5 g. of succinic acid dichloride (0.3 mole) and 144 g. of citric acid tri-n-butyl ester (0.4 mole) are heated at 100–110° C. for 7 hours while stirring. Subsequently, the crude ester is poured into water, neutralized by the addition of sodium bicarbonate, washed with water, and separated. The ester is dissolved in ether. The ether solution is washed with water, dried over sodium sulfate and the ether is distilled off. Thereby, the succinic acid 1,4-bis-(citric acid tri-n-butyl) ester is obtained in a yield of 68% of the theoretical yield. Saponification number: 560 (theoretical value 559).

*Example 6.—Succinic acid 1,4-bis-(citric acid tri-iso-octyl) ester*

31 g. of succinic acid dichloride (0.2 mole) and 106 g. of citric acid tri-iso-octyl ester (0.2 mole) are heated to 120° C. for about 12 hours. The reaction product is poured into water with stirring and is neutralized by the addition of sodium bicarbonate. The ester is thoroughly washed with water and dissolved in ether. The etheral solution is dried over sodium sulfate. The ether is distilled off. Succinic acid 1,4-bis-(citric acid tri-iso-octyl) ester is obtained in a yield of 65% of the theoretical yield. Saponication number: 395 (theoretical value: 394).

*Example 7.—Glutaric acid 1,5-bis-(citric acid trimethyl) ester*

17 g. of glutaric acid dichloride (0.1 mole) and 47 g. of citric acid trimethyl ester (0.2 mole) are heated in a water bath at 80–90° C. for 6 hours while stirring. The reaction product is poured into water and is neutralized by the addition of sodium bicarbonate solution. The ester is thoroughly washed with water, dissolved in ether, and the etheral solution is dried over sodium sulfate. After distilling off the ether, glutaric acid 1,5-bis-(citric acid trimethyl) ester is obtained in a yield of 60% of the theoretical yield. Saponification number: 790 (theoretical value: 794).

*Example 8.—Glutaric acid 1,5-bis-(citric acid triethyl) ester*

17 g. of glutaric acid dichloride (0.1 mole) and 55 g. of citric acid triethyl ester (0.2 mole) are heated in the water bath at 80–90° C. for 6 hours while stirring. The reaction product is poured into water and is neutralized by the addition of sodium bicarbonate. The ester is thoroughly washed with water, dissolved in ether, and the etheral solution is dried over sodium sulfate. After distilling off the ether, glutaric acid 1,5-bis-(citric acid triethyl) ester is obtained in a yield of 70% of the theoretical yield. Saponification number: 686 (theoretical value: 691).

*Example 9.—Adipic acid 1,6-bis-(citric acid trimethyl) ester*

18.3 g. of adipic acid dichloride (0.1 mole) and 46.8 g. of citric acid trimethyl ester (0.2 mole) are heated to 80° C. in a water bath for 6 hours while stirring. After cooling, the reaction mixture is neutralized with an aqueous sodium bicarbonate solution, thoroughly washed with water, and the ester layer is dissolved in ether. The etheral solution is dried over sodium sulfate and the ether is distilled off. Adipic acid 1,6-bis-(citric acid trimethyl) ester is obtained in the form of a viscous oil which crystallizes after standing for some time. Yield: 64% of the theoretical yield. Saponification number: 778 (theoretical value: 775).

*Example 10.—Adipic acid 1,6-bis-(citric acid triethyl) ester*

18.3 g. of adipic acid dichloride (0.1 mole) and 55 g. of citric acid triethyl ester (0.2 mole) are heated to 80° C. in a water bath for 6 hours while stirring. After cooling, the reaction product is neutralized by the addition of aqueous sodium bicarbonate solution. The ester is thoroughly washed with water and the ester layer is then dissolved in ether. The ethereal solution is dried over sodium sulfate and the ether is distilled off. Adipic ester 1,6-bis-(citric acid triethyl) ester is obtained in the form of an oil. Yield: 85% of the theoretical yield. Saponification number: 680 (theoretical value: 677).

*Example 11.—Adipic acid 1,6-bis-(citric acid tri-n-butyl) ester*

18.3 g. of adipic acid dichloride (0.1 mole) and 72 g. of citric acid tri-n-butyl ester (0.2 mole) are heated at 80° C. in a water bath for 6 hours while stirring. After cooling, the reaction product is neutralized by the addition of an aqueous sodium bicarbonate solution, thoroughly washed with water, and the ester layer is dissolved in ether. After drying the ethereal solution over sodium sulfate and distilling off the ether, adipic acid 1,6-bis-(citric acid tri-n-butyl) ester is obtained in the form of an oil. Yield: 80% of the theoretical yield. Saponification number: 538 (theoretical value: 540).

*Example 12.—Adipic acid 1,6-bis-(citric acid tri-iso-octyl) ester*

27.4 g. of adipic acid dichloride (0.15 mole) 105.6 g. of citric acid tri-iso-octyl ester (0.2 mole) are heated at 80° C. in a water bath for 6 hours while stirring. After cooling, the reaction product is neutralized by the addition of an aqueous sodium bicarbonate solution, thoroughly washed with water, and the ester layer is dissolved in ether. The ethereal solution is dried over sodium sulfate and the ether is distilled off. The resulting adipic acid 1,6-bis-(citric acid tri-iso-octyl) ester is obtained in a yield of 87.5% of the theoretical yield. Saponnification number: 377 (theoretical value: 384).

*Example 13.—Sebacic acid 1,10-bis-(citric acid trimethyl) ester*

23.9 g. of sebacic acid dichloride (0.1 mole) and 46.8 g. of citric acid trimethyl ester (0.2 mole) are heated to 80–90° C. for 6 hours while stirring. The resulting reaction product is poured into water while stirring, neutralized by the addition of sodium bicarbonate, and the ester layer is then thoruoghly washed with water and dissolved in ether. The ethereal solution is dried over sodium sulfate. The ether is distilled off. Sebacic acid 1,10-bis-(citric acid trimethyl) ester is obtained as a viscous oil which crystallizes on standing. Yield: 63% of the theoretical yield. Saponification number: 704 (theoretical value: 707).

*Example 14.—Sebacic acid 1,10-bis-(citric acid triethyl) ester*

24 g. of sebacic acid dichloride (0.1 mole) and 55 g. of citric acid triethyl ester (0.2 mole) are heated to 80–90° C. for 6 hours while stirring. The resulting reaction product is poured into water while stirring, and is neutralized by the addition of sodium bicarbonate. The ester layer is then thoroughly washed with water and is dissolved in ether. The ethereal solution is dried over sodium sulfate. After distilling off the ether, sebacic acid 1,10-bis-(citric acid triethyl) ester is obtained as a viscous oil. Yield: 79% of the theoretical yield. Saponification number: 623 (calculated: 624).

*Example 15.—Succinic acid 1,4-bis-(citric acid triisononyl) ester*

23 g. of succinic acid dichloride (0.15 mole) and 114 g. of triisononyl citrate (0.2 mole) are heated in a water bath to 90° C. for 24 hours while stirring. The resulting crude ester is poured into water, neutralized by the addition of sodium bicarbonate, and thoroughly washed with water. The separated ester is further purified by dissolving it in ether, washing the ethereal solution with water, drying the solution over sodium sulfate, and distilling off the ether. Succinic acid 1,4-bis-(citric acid triisononyl) ester is obtained in a yield of 79%. Saponification number: 360 (theoretical value: 367).

*Example 16.—Succinic acid 1,4-bis-(citric acid triisodecyl) ester*

23 g. of succinic acid dichloride (0.15 mole) and 122 g. of triisodecyl citrate (0.2 mole) are heated to 90° C. for 25 hours. The resulting reaction product is poured into water while stirring and neutralized by the addition of sodium bicarbonate. The ester is thoroughly washed with water and is dissolved in ether. The ethereal solution is dried over sodium sulfate. After distilling off the ether, succinic acid 1,4-bis-(citric acid triisodecyl) ester is obtained in a yield of 85%. Saponification number: 345 (theoretical value: 343).

*Example 17.—Succinic acid 1,4-bis-(citric acid tricyclohexyl) ester*

39 g. of succinic acid dichloride (0.25 mole) and 175 g. of tricyclohexyl citrate (0.4 mole) are heated to 100° C. for 10 hours while stirring and subsequently to 130–140° C. for 6 hours. The reaction product is poured into water and is neutralized by the addition of sodium bicarbonate. The ester layer is thoroughly washed with water and dissolved in ether. The ethereal solution is dried over sodium sulfate and the ether is distilled off. Succinic acid 1,4-bis-(citric acid tricyclohexyl) ester is obtained in a yield of 75% of the theoretical yield. Saponification number: 460 (theoretical value: 468).

*Example 18.—Azelaic acid 1,9-bis-(citric acid triethyl) ester*

45 g. of azelaic acid, dichloride (0.2 mole) and 111 g. of triethyl citrate (0.4 mole) are heated to 80–90° C. in a water bath for 9 hours while stirring. The reaction product is poured into water, neutralized by the addition of sodium bicarbonate, and thoroughly washed with water. On drying in a vacuum, azelaic acid 1,9-bis-(citric acid triethyl) ester is obtained in a yield of 81% of the theoretical yield. Saponification number: 638 (theoretical value: 636).

*Example 19.—Phthalic acid bis-(citric acid triethyl) ester*

51 g. of phthalic acid dichloride (0.25 mole) and 110 g. of triethyl citrate (0.4 mole) are heated to 90–100° C. for 8 hours while stirring and thereafter to 140° C. for 10 hours. The crude ester is poured into water, neutralized by the addition of sodium bicarbonate, and dissolved in ether. After drying over sodium sulfate and distilling off the ether, phthalic acid bis-(citric acid triethyl ester) is obtained in a yield of 70% of the theoretical yield. Saponification number: 654 (calculated: 657).

The following tables show that the new citric acid esters according to the present invention have the surprising property to be highly resistant to oils and fats. This property is of the greatest importance for their technical use. Heretofore, films and foils as they were employed as packing materials for edible oils or fats or foodstuffs which contain such oils or fats could be produced only by using plasticizers which give up the plasticizer to the foodstuff so that adulteration thereof to an inadmissible degree could not be avoided. In contrast thereto, foils or films which have been made with the addition of citric acid esters according to the present invention can be used without any difficulty as packing materials for oil and/or fat-containing foodstuff, because such plasticizers do not pass over into the oils or fats. This result is rather surprising because it is known that only plasticizers of the higher polymer polyester type have such properties. Furthermore, the citric acid esters according to the present invention may be used to prevent exudation and migration of primary plasticizers used from such foils or films into other foils or films or into fat or oil containing materials on contact therewith. This result is achieved, for instance, by providing the conventional foils or films with covering or lining layers containing only citric acid esters according to the present invention. Such covering or lining layers may be produced by laminating, painting, coating, or in any other suitable manner.

The following Table I shows the loss in weight of plasticizer on contact of soybean oils with a polyvinyl chloride foil containing the plasticizer. The test foils were obtained by thoroughly mixing 60 parts of an emulsion polyvinyl chloride sold under the trademark "Vestolit P" by Chemische Werke Huels, Germany, and 40 parts of the respective plasticizer or mixture of plasticizers. The mixture was homogenized and converted into a film layer of a thickness of 300–400μ. Gelation was effected by heating to 180° C. for 10 minutes. The oil resistance of the plasticizer was determined by contacting films of the same size and area with a special soybean oil at 40° C. for 24 hours.

TABLE I

| Test No. | Plasticizer or plasticizer mixture | Percent loss in weight into soybean oil |
|---|---|---|
| 1 | 40 parts of succinic acid 1,4-bis-(citric acid triethyl) ester. | 0.4 |
| 2 | 30 parts of succinic acid 1,4-bis-(citric acid triethyl) ester, 10 parts of acetyl tributylcitrate sold under the trademark "Citrofol B II". | 1.9 |
| 3 | 20 parts of succinic acid 1,4-bis-(citric acid triethyl) ester, 20 parts of "Citrofol B II". | 2.5 |
| 4 | 10 parts of succinic acid 1,4-bis-(citric acid triethyl) ester, 30 parts of "Citrofol B II". | 5.1 |
| 5 | 40 parts of succinic acid 1,4-bis-(citric acid tripropyl) ester. | 2.6 |
| 6 | 4.5 parts of glutaric acid 1,5-bis-(citric acid triethyl) ester, 35.5 parts of "Citrofol B II". | 5.2 |
| 7 | 40 parts of adipic ester 1,6-bis-(citric acid triethyl) ester. | 3.2 |
| 8 | 4.5 parts of sebacic acid 1,10-bis-(citric acid triethyl ester), 35.5 parts of "Citrofol B II". | 4.1 |
| 9 | 20 parts of succinic acid 1,4-bis-(citric acid tricyclohexyl) ester, 20 parts of "Citrofol B II". | 0.7 |
| 10 | 40 parts of azelaic acid 1,4-bis-(citric acid triethyl) ester. | 1.2 |
| 11 | 40 parts of phthalic acid bis-(citric acid triethyl) ester. | 1.9 |
| 12 | 20 parts of glutaric acid 1,5-bis-(citric acid trimethyl) ester, 20 parts of "Citrofol B II". | 1.7 |
| 13 | 20 parts of adipic acid 1,6-bis-(citric acid trimethyl ester), 20 parts of "Citrofol B II". | 4.5 |
| 14 | 20 parts of sebacic acid 1,10-bis-(citric acid trimethyl) ester, 20 parts of "Citrofol B II". | 1.9 |
| 15 | Comparative test with 40 parts of "Citrofol B II". | 7.4 |
| 16 | Comparative test with 40 parts of dibutylphthalate. | 9.9 |
| 17 | Comparative test with 40 parts of dinonylphthalate. | 14.5 |
| 18 | Comparative test with 40 parts of dioctylphthalate. | 13.0 |

It is evident that the citric acid esters according to the present invention are far superior in their resistance to exudation and dissolution by oils to the known citric acid esters such as acetyl tributyl citrate.

The test results given in Table II were obtained with foils produced by mixing polyvinyl chloride sold under the trademark "Vestolit P" and the respective plasticizer, homogenizing the mixture, converting it into a film, and gelation the film at 180° C. for 10 minutes. The oil resistance was determined by contacting the film with special soybean oil at 20° C. for 10 days.

TABLE II

| Test No. | Composition of the foils | Percent loss in weight into soybean oil |
|---|---|---|
| 1 | 60 parts of "Vestolit P", 40 parts of glutaric acid 1,5-(citric acid triethyl) ester. | 1.33 |
| 2 | 60 parts of "Vestolit P", 40 parts of sebacic acid 1,10-bis-(citric acid triethyl) ester. | 1.44 |

The citric acid esters according to the present invention are also used with great advantage as plasticizers for finishing vegetable fibers and regenerated cellulose, fabrics, paper, and cardboard which materials have been impregnated with synthetic resins for producing materials of improved wet strength, for rendering them non-creasing, and for other purposes. The materials to be finished are impregnated with solutions of water soluble initial condensation products of the carbamide resin type based on methylol-urea, dimethylol-urea, methylol-melamine. Such initial condensation products are, for instance, incompletely polymerized methyl ethers of methylol-melamines which contain at least 2.8 moles of bound formaldehyde and 2 moles of bound methanol per mole of melamine. Other products used for such impregnation are formaldehyde condensation products with 2,6-diamino-4-methyl-1,3,5-triazine or pentamethylol triamino triazine, or 2,4,6-triamino-1,3,5-triazine. Thereby, additions of 1% to 10% of the citric acid ester according to the present invention, calculated for the solid content of the solution of the initial condensation product, are added. Such an addition of citric acid esters according to the present invention markedly improves in various respects the materials when impregnated with such synthetic resins. The bis-citirc acid esters according to the present invention are preferably used in the form of an aqueous emulsion whereby di-tridecyl citrate has proved to be an especially suitable emulsifier. The preferred emulsifier is the sodium salt of said di-tridecyl citrate.

In addition to the above mentioned plastic materials, synthetic resins, and lacquers, the bis-citric acid esters according to the present invention may also be used with great advantage for plasticizing polyamides, for instance, polyamides made from caprolactam or from hexamethylene diamine and adipic acid, or similar polyamides. Other polyamides made by reacting other organic dicarboxylic acids and other organic diamines, for instance, the polyamide solid under the trademark "Ultramid 1C, 6A" by Badische Anilin- und Sodafabrik, Ludwigshafen (Rhine), Germany.

The citric acid esters according to the present invention can not only be used in nitro cellulose lacquers as stated hereinabove but also in multicomponent lacquers containing several components with great advantage. Components of such lacquers are, for instance, the polyurethanes as they are sold under the trademarks "Desmodur" and "Desmophen" by Farbenfabriken Bayer of Leverkusen, Germany.

Surprising improvements are also achieved when incorporating the bis-citric acid esters according to the present invention into chlorinated rubbers and lacquers made therefrom, into hydrochlorinated rubber and especially into films produced therefrom as they are known as pliofilm.

Of course, many changes and variations in the dicarboxylic acid and alcohol comopnents of the new citric acid esters, in their methods of preparation, the reaction conditions, temperature, duration, pressure, and the like, in the methods of working up the esterification mixtures and of isolating and purifying the new esters, in the amounts in which these new esters are added to synthetic resins and plastic materials, and the like, in the use of said esters, and the like may be made by those skilled in this art in accordance with the principles set forth herein and in the claims annexed hereto. The condensation products cited on page 18, lines 3 and 4, are known by the following references:

(1) DAS Serial No. 1,092,653, dated January 14, 1958, (Chemische Fabrik Pfersee G.m.b.H., Augsburg/Germany).

(2) O. Hansen, "Das Papier," 4, page 137 (1950).

(3) L. Diserens, "Neue Verfahren in der Technik der chemischen Veredlung der Textilfasern," Bd. III, pages 520–535, edition Birkhaeuser, Basel-Stuttgart, 1952.

We claim:

1. Bis-citric acid esters of the formula:

$$\begin{array}{ll} R_1OOC-CH_2 & H_2C-COOR_4 \\ R_2OOC-C-O-C-(Y)_n-C-O-C-COOR_5 \\ R_3OOC-CH_2 \quad O \qquad O \quad H_2C-COOR_6 \end{array}$$

wherein:

$R_1$, $R_2$, $R_3$, $R_4$, $R_5$, and $R_6$ represent alkyl with 1 to 18 carbon atoms, $n$ is one of the integers 0 and 1, and when $n$ is 1, Y is a member selected from the group consisting of alkylene of 1 to 8 carbon atoms, alkenylene of 2 to 3 carbon atoms, and phenylene.

2. Succinic acid 1,4-bis-(citric acid triethyl) ester.
3. Succinic acid 1,4-bis-(citric acid tri-n-propyl) ester.
4. Glutaric acid 1,5-bis-(citric acid triethyl) ester.
5. Sebacic acid 1,10-bis-(citric acid triethyl ester.
6. Succinic acid 1,4-bis-(citric acid trialkyl) ester, the alkyl radical in said ester having 1 to 18 carbon atoms.
7. Glutaric acid 1,5-bis-(citric acid trialkyl) ester, the alkyl radical in said ester having 1 to 18 carbon atoms.
8. Sebacic acid 1,10-bis-(citric acid trialkyl) ester, the alkyl radical in said ester having 1 to 18 carbon atoms.
9. Phthalic acid bis-(citric acid triethyl) ester.
10. Phthalic acid bis-(citric acid trialkyl) ester, the alkyl radical in said ester having 1 to 18 carbon atoms.

References Cited by the Examiner

UNITED STATES PATENTS

| | | | |
|---|---|---|---|
| 2,886,590 | 5/1959 | Montgomery et al. | 260—484 |
| 2,915,551 | 12/1959 | Wolf et al. | 260—484 |
| 2,958,669 | 11/1960 | Hoffmann | 260—31.8 |
| 2,965,598 | 12/1960 | Birum et al. | 260—31.8 |
| 3,025,271 | 3/1962 | Borchert | 260—484 X |

FOREIGN PATENTS 629,235  10/1961  Canada.

LORRAINE A. WEINBERGER, *Primary Examiner.*

LEON J. BERCOVITZ, LEON ZITVER, *Examiners.*

J. A. KOLASCH, R. E. MASSA, T. L. GALLOWAY, *Assistant Examiners.*